US012385455B2

(12) United States Patent
Linton et al.

(10) Patent No.: US 12,385,455 B2
(45) Date of Patent: Aug. 12, 2025

(54) FUEL PUMP ASSEMBLY WITH MULTIPLE PUMPS AND VARIABLE OUTPUT

(71) Applicant: Walbro LLC, Cass City, MI (US)

(72) Inventors: Robby L. Linton, Saginaw, MI (US); Edward J. Talaski, Caro, MI (US)

(73) Assignee: WALBRO LLC, Cass City, MI (US)

( * ) Notice: Subject to any disclaimer, the term of this patent is extended or adjusted under 35 U.S.C. 154(b) by 408 days.

(21) Appl. No.: 17/853,567

(22) Filed: Jun. 29, 2022

(65) Prior Publication Data

US 2023/0003182 A1 Jan. 5, 2023

Related U.S. Application Data

(60) Provisional application No. 63/216,741, filed on Jun. 30, 2021.

(51) Int. Cl.

*F02M 37/10* (2006.01)
*F02M 37/08* (2006.01)
*F02M 51/04* (2006.01)

(52) U.S. Cl.

CPC ............ *F02M 37/10* (2013.01); *F02M 51/04* (2013.01); *F02M 2037/085* (2013.01)

(58) Field of Classification Search

CPC ... F02M 37/10; F02M 51/04; F02M 2037/085
See application file for complete search history.

(56) References Cited

U.S. PATENT DOCUMENTS 4,436,486 A * 3/1984 Jensen ..................... H02P 1/44 417/45
4,683,864 A 8/1987 Bucci
4,827,897 A * 5/1989 Yamada ................. F02M 37/08 417/365
5,655,504 A 8/1997 Iwai
6,283,142 B1 9/2001 Wheeler et al.
7,881,035 B2 * 2/2011 Takahashi ............... F04B 49/10 361/160
10,165,648 B2 * 12/2018 Regau .................... H05B 45/54
2001/0032622 A1 * 10/2001 Joos ....................... F02M 37/08 123/497

(Continued)

FOREIGN PATENT DOCUMENTS

JP 2009235960 A 10/2009
JP 2009243446 A 10/2009
WO WO2018045311 A2 3/2018

OTHER PUBLICATIONS

Written Opinion & International Search Report for PCT/US2019/066784 dated Apr. 17, 2020, 12 pages.

*Primary Examiner* — Kurt Philip Liethen

(74) *Attorney, Agent, or Firm* — DAY PITNEY LLP; George N. Chaclas; Christopher J. Head

(57) ABSTRACT

In at least some implementations, a fuel system includes a first fuel pump and a first switch adapted to be coupled to a power supply, and a second fuel pump adapted to be coupled to the power supply. A conductor is provided between a first node between the first fuel pump and the first switch and a second node to which the second fuel pump is electrically coupled or electrically communicated so that depending upon the state of the first switch power may be supplied to the first fuel pump and second fuel pump in series or in parallel.

19 Claims, 5 Drawing Sheets

(56) References Cited

U.S. PATENT DOCUMENTS

| | | | | |
|---|---|---|---|---|
| 2005/0286189 | A1* | 12/2005 | Rhodes | H02J 3/00 361/62 |
| 2008/0230035 | A1* | 9/2008 | Inoue | F04B 49/065 388/811 |
| 2013/0328491 | A1* | 12/2013 | Chou | H05B 45/395 315/191 |
| 2015/0285150 | A1* | 10/2015 | Masuda | F02C 9/28 60/734 |
| 2016/0138473 | A1* | 5/2016 | Veilleux, Jr. | F02C 7/22 137/59 |

* cited by examiner

FUEL PUMP ASSEMBLY WITH MULTIPLE PUMPS AND VARIABLE OUTPUT

REFERENCE TO RELATED APPLICATIONS

This application claims the benefit of U.S. Provisional Application Ser. No. 63/216,741 filed on Jun. 30, 2021 the entire content of which is incorporated herein by reference in its entirety.

TECHNICAL FIELD

The present disclosure relates generally to a fuel system that has more than one fuel pump.

BACKGROUND

Fuel systems sometimes have two fuel pumps with a lift pump providing fuel under relatively low pressure from a fuel tank to a high pressure fuel pump that provides fuel under higher pressure to an engine, to support engine operation. In this system, full electrical power or voltage is provided to both the lift pump and high pressure fuel pump all the time. Fuel delivered in excess of the engine's demand for fuel is returned to the fuel tank, and the fuel pump and the pumped fuel can become heated. Further, these systems do not have a valve mechanism to allow the fuel pump outputs to combine in series, so the output is determined by the output of the high pressure fuel pump.

SUMMARY

In at least some implementations, a fuel system includes a first fuel pump and a first switch adapted to be coupled to a power supply, and a second fuel pump adapted to be coupled to the power supply. A conductor is provided between a first node between the first fuel pump and the first switch and a second node to which the second fuel pump is electrically coupled or electrically communicated so that depending upon the state of the first switch power may be supplied to the first fuel pump and second fuel pump in series or in parallel.

In at least some implementations, when the first switch is open the first fuel pump and second fuel pump are electrically in series. In at least some implementations, when the first switch is closed the first fuel pump and second fuel pump are electrically in parallel. In at least some implementations, the first switch is a semiconductor switch including one of a SCR, MOSFET, BJT, MCT, IGCT or IGBT.

In at least some implementations, a second switch is arranged so that when the second switch is open current does not flow to either the first fuel pump or second fuel pump, and when the second switch is closed, current may flow to the first fuel pump and second fuel pump. In at least some implementations, the second switch is coupled between a positive lead of the second pump and a positive terminal adapted to be coupled to a power supply.

In at least some implementations, the first switch is connected between a negative lead of the first pump and a negative terminal adapted to be coupled to a power supply. In at least some implementations, a controller is coupled to the first switch and capable of changing the state of the first switch. In at least some implementations, the controller provides a pulse width modulated signal to the first switch.

In at least some implementations, a second switch is arranged so that when the second switch is open and the first switch is open, power is supplied in series to the first fuel pump and to the second fuel pump. In at least some implementations, a second switch is arranged so that when the second switch is closed and the first switch is closed, power is supplied in parallel to the first fuel pump and to the second fuel pump.

In at least some implementations, a controller is coupled to the first node to change the voltage at the first node, and a diode is coupled to the conductor between the first node and the second node, and the diode conducts electricity from a negative terminal of the first pump to a positive terminal of the second pump. In at least some implementations, the controller is a pulse width modulated controller.

In at least some implementations, a fuel system includes a first fuel pump and a first switch adapted to be coupled to a power supply, and a second fuel pump and a second switch adapted to be coupled to the power supply. A conductor is provided between a first node between the first fuel pump and the first switch and a second node between the second switch and the second fuel pump. When the second switch is open and the first switch is open, power is supplied in series to the first fuel pump and to the second fuel pump. And when the second switch is closed and the first switch is closed, power is supplied in parallel to the first fuel pump and to the second fuel pump. In at least some implementations, the first switch is coupled between the negative lead of the first fuel pump and a negative power supply terminal, and the second switch is coupled between the positive lead of the second fuel pump and a positive power supply terminal.

In at least some implementations, a controller is coupled to the first switch and capable of changing the state of the first switch. In at least some implementations, the controller provides a pulse width modulated signal to the first switch.

In at least some implementations, a controller is coupled to the first node to change the voltage at the first node, and which also includes a diode coupled to the conductor between the first node and the second node, the diode conducting electricity from a negative terminal of the first pump to a positive terminal of the second pump. And the controller may be a pulse width modulated controller.

BRIEF DESCRIPTION OF THE DRAWINGS

The following detailed description of certain embodiments and best mode will be set forth with reference to the accompanying drawings, in which.

DETAILED DESCRIPTION

Figure 1:
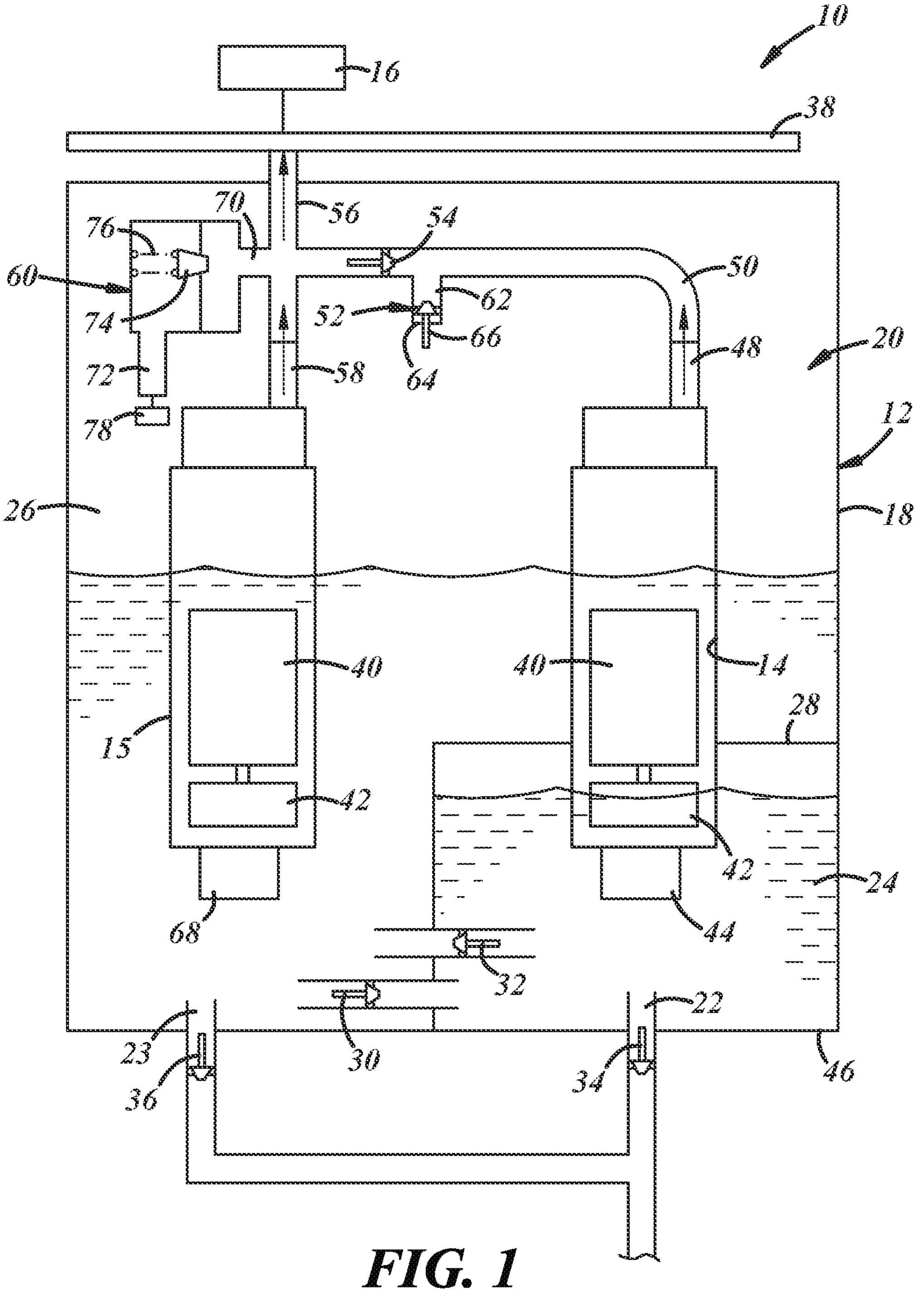
FIG. 1 is a schematic view of a fuel pump assembly including two fuel pumps received within a container in which a supply of fuel is maintained.

Referring in more detail to the drawings, FIG. 1 illustrates a fuel pump assembly 10 having a container or reservoir 12 in which a supply of fuel is contained, and multiple fuel pumps, shown as a first fuel pump 14 and a second fuel pump 15, arranged to pump fuel from the reservoir 12 for use by an engine 16. During times of high engine fuel demand, each fuel pump (i.e. both pumps 14 and 15 in the illustrated example) may provide fuel to the engine together, and during times of lesser engine fuel demand, fewer than all pumps (i.e. only one pump 15 in the illustrated example) provides fuel to the engine. In this way, the maximum flow rate of fuel from the fuel pump assembly 10 to the engine 16 may be greater than the maximum output flow rate from any one fuel pump 14 or 15, but such maximum flow rate of fuel to the engine may be selectively provided from the fuel pumps 14, 15 when demanded by the engine rather than continuously. Various valves and/or other flow controllers may be used to control the routing of fuel in and from the fuel assembly, as set forth in more detail below.

The reservoir 12 may include or be defined at least in part by a main body 18 that defines at least part of an internal volume or interior 20 in which liquid fuel is retained. A first inlet 22 of the reservoir 12 may be communicated with a first portion 24 of the interior 20, and a second inlet 23 of the reservoir may be communicated with a second portion 26 of the interior 20. The first and second portions 24, 26 of the reservoir interior 20 may be separated from each other by a wall 28 or other divider (with the first portion 24 on one side of the divider and the second portion 26 on the other side of the divider), and may communicate with each other through one or more valves provided in the wall 28 or divider, to ensure at least some fuel is present in each portion 24, 26 so long as there is fuel in either portion at or above the height/level of one of the valves (or the only valve when only one valve is provided). In at least some implementations, two oppositely acting check valves 30, 32 are provided to control fuel flow between the first portion 24 and the second portion 26. Inlet check valves 34 and 36 may be provided in the first and second inlets 22, 23, respectively, to prevent flow of fuel out of the reservoir through the first and second inlets, and to control flow into the first portion 24 and the second portion 26 as a function of pressure differentials across the inlet check valves 34, 36. With the valve 30 permitting flow from the first portion 24 to the second portion 26, the second inlet check valve 36 and second inlet 23 may be omitted, as the second pump 15 may draw fuel into the reservoir interior 20 through the first inlet 22 and the valve 30, in at least some circumstances. In at least some implementations, the reservoir main body 18 may be supported by a mounting flange 38 that is sealed to a fuel tank, to support the fuel pump assembly 10 within the fuel tank. Of course, other arrangements may be used, including arrangements in which the fuel pump assembly 10 is mounted outside of the fuel tank (e.g. not within an interior of the fuel tank) in which case the reservoir 12 may include a lid or second body coupled to the main body 12 to enclose the interior 20.

The first and second fuel pumps 14 and 15 may each include an electric motor 40 and a pumping element 42 driven by the motor 40. The pumping elements 42 may be a of a positive displacement type, like a gerotor or screw pump, or a centripetal pump like a turbine type pump with an impeller, as is known in the art. The fuel pumps 14 and 15 may be identical in construction (i.e. size, motor, output capability, etc) or they may be different, as desired for a particular application.

The first fuel pump 14 may be arranged to move fuel from a fuel supply (e.g. an interior of a fuel tank) into the reservoir interior 20 through the first inlet 22 of the reservoir, and to move fuel from the first portion 24 to the second portion 26 and/or to the engine 16. To draw fuel into the first portion 24 and to take fuel from the first portion 24 into the fuel pump 14, the fuel pump 14 has an inlet 44 communicated with the pumping element 42 and in or at which a subatmospheric or decreased pressure is caused by rotation of the pumping element 42. A low pressure fuel pump could instead be used to move fuel from the fuel tank to the first portion 24 of the reservoir 12 communicated with the fuel pump inlet. That is, in at least some implementations, a third pump may be used to deliver fuel to the fuel pump assembly 10, if desired. The first pump inlet 44 may be arranged in the first portion 24 so that it is relatively close to a bottom wall 46 of the reservoir 12, for example, within one-half of an inch to facilitate drawing in fuel even when relatively little fuel is within the first portion 24. In this position, the first pump inlet 44 may be submerged in liquid fuel during normal operation of the assembly 10, which may include all or nearly all instances except where the fuel supply is low on fuel and when the reservoir 12 has a low level of or no fuel therein. This may maintain a head of liquid at the first pump inlet 44, and the first pump inlet 44 wetted to improve the performance and efficiency of the first pump 14. The first fuel pump 14 has an outlet 48 through which fuel is discharged from the pump 14 and from the first portion 24 of the interior 20. The first pump outlet 48 is communicated with a passage 50 that routes the fuel away from the first pump 14.

The passage 50 may be defined by one or more conduits or bodies that may carry one or more components that control fuel flow through the passage. In the example shown, the passage 50 includes or communicates with, to direct fuel flow to, one or more of a flow control valve 52, a check valve 54, a fuel assembly outlet 56 through which fuel is discharged from the fuel assembly 10 (e.g. to the engine 16), an outlet 58 of the second pump 15, and a fuel pressure regulator 60. The flow control valve 52 has an inlet 62 in communication with the passage 50, an outlet 64 in communication with the second portion 26 of the reservoir 20 and a valve body 66 that controls flow through the valve 52. The valve body 66 is movable between first and second positions. When the valve body 66 is in a first position, the valve body 66 permits fuel flow through the valve outlet 64 to direct fuel discharged from the first pump 14 into the second portion 26 of the reservoir interior 20. When the valve body 66 is in a second position, the valve element prevents fuel flow through the valve outlet 64 and fuel discharged from the first fuel pump 14 flows past the flow control valve 52 and through the check valve 54. The check valve 54 may be arranged to permit fluid flow from the first fuel pump 14 to the fuel assembly outlet 56, but to prevent the reverse flow through the passage 50 so that fuel downstream of the check valve 54 is not drained through the fuel control valve 52 or first fuel pump 14.

The second fuel pump 15 may be arranged to do one or both of move fuel from a fuel supply into the second portion 26 of the reservoir interior 20 through the second inlet 23, and move fuel from the second portion 26 of the reservoir interior 20 to the fuel pump assembly outlet 56 for delivery to the engine 16. To draw fuel into the second portion 26 and to take fuel from the second portion 26 into the second fuel pump 15, the second fuel pump 15 has an inlet 68 communicated with the pumping element 42 and in or at which a subatmospheric or decreased pressure is caused by rotation of the pumping element 42. The second pump inlet 68 may be arranged in the second portion 26 so that it is relatively close to the bottom wall 46 of the reservoir 12, for example, within one-half of an inch to facilitate drawing in fuel even when relatively little fuel is within the second portion 26. In this position, the second pump inlet 68 may be submerged in liquid fuel during normal operation of the assembly 10, which may include all or nearly all instances except where the fuel supply is low on fuel and when the reservoir 12 has a low level of or no fuel therein. This may maintain a head of liquid at the second pump inlet 68, and the second pump inlet 68 wetted to improve the performance and efficiency of the second pump 15. Fuel is discharged from the second pump 15 and from the second portion 26 of the reservoir interior 20 through the second pump outlet 58.

The second pump outlet 58 is communicated with the passage 50 and the fuel pump assembly outlet 56. In at least some implementations, the check valve 54 and the fuel control valve 52 are between the outlets 48, 58 of the first and second pumps 14, 15, and relative to the second pump 15, the flow control valve 52 is downstream of the check valve 54 such that the check valve 54 prevents fuel discharged from the second pump 15 from flowing to the flow control valve 52. The fuel discharged from the second pump 15 may be communicated with the pressure regulator 60. The pressure regulator 60 may include an inlet 70, an outlet 72 and a valve body 74 between the inlet 70 and outlet 72. When the fuel pressure at the valve inlet is below a threshold (which may be defined at least in part by a spring 76 that biases the valve body 74), the valve body 74 prevents fuel flow through the valve outlet 72 and the fuel flows through the fuel pump assembly main outlet 56 for delivery to the engine 16. When the fuel pressure at the valve inlet 70 is above the threshold pressure, the valve body 74 is moved to an open position to permit some fuel flow out of the valve outlet 72 and into the second portion 26 of the reservoir interior 20 (and/or first portion 24, if desired). This reduces the pressure of the fuel so that the pressure of fuel delivered to the engine 16 may be regulated, in known manner. Fuel discharged from the first pump 14 that does not flow through the fuel control valve 52 to the second portion 26 of the reservoir interior 20, is combined with fuel discharged from the second pump 15, and the pressure of the combined fuel flows is regulated by pressure regulator 60 in the same manner and the combined fuel flow is discharged from the fuel pump assembly 10 through the main outlet 56, in at least some operating conditions.

Thus, both fuel pumps 14 and 15 may draw fuel into the reservoir interior 20 and both fuel pumps 14, 15 may discharge fuel from the reservoir interior 20 for delivery to the engine 16. In this way, the amount that may be taken into the reservoir interior 20 to support pumping fuel to the engine 16 is not limited by the intake capacity of just one pump 14 or 15, as both pumps 14 and 15 draw fuel into the reservoir 12. Similarly, the flow rate of fuel delivered from the fuel pump assembly 10 is not limited to the output flow rate of just one pump 14 or 15 as both pumps 14 and 15 may simultaneously provide fuel to the engine 16. In this way, the maximum fuel flow rate from the assembly 10 may be greater than the flow rate possible from either fuel pump 14 or 15 by itself.

In at least some implementations, when the engine fuel demand is less than or equal to the maximum fuel output of the second pump 15, the output from the first pump 14 may be directed into the second portion 26 of the reservoir interior 20 to provide fuel for the second pump 15, and the first pump 14 can boost or increase pressure of fuel provided to the second pump 15. The check valve 36 through which fuel enters the second portion 26 of the reservoir interior 20 will close when there is a positive pressure in the second portion 26. Also, the check valve 30 will close and the check valve 32 will open if there is a positive pressure in the second portion 26 of the reservoir interior 20. When the engine fuel demand exceeds the maximum fuel output of the second pump 15, the fuel control valve 52 may reduce the flow rate of or prevent fuel flow through the control valve outlet 64 so that at least a portion and up to all of the fuel discharged from the first pump 14 is combined with the fuel discharged from the second pump 15 for delivery to the engine 16. Of course, at least some output from the first pump 14 can be used to supplement the fuel pressure provided to the second pump 15 when the engine fuel demand is below the maximum fuel output of the second pump 15, as desired. In at least some implementations, some of the fuel from both pumps 14 and 15 may be used to satisfy the engine's fuel demand over a wide range of fuel flow rates up to and including all fuel flow rate demands of the engine 16. In at least some implementations, when the engine fuel demand can be met by either pump, the other pump may be shut off or not powered. That is, the engine fuel demand up to a threshold could be met by only the first fuel pump 14, or by only the second fuel pump 15, in at least some implementations.

The motor 40 of either or both of the first and second pumps 14, 15 can be operated by a pulse width modulated signal to vary the electrical power provided to the pump motor 40 and thereby vary the pump output to support the engine fuel demand. The fuel control valve 52 can be responsive to a fuel output flow rate, for example with a flow rate sensor providing a signal used to close the fuel control valve 52 which may be, for example, an electro-mechanical valve such as a solenoid valve. For example, when the output of the first fuel pump 14 is above a threshold level, for example but not limited to 100 liters per hour, the fuel control valve 52 may be closed to route the output of the first fuel pump 14 to the engine 16 (subject to some fuel being bypassed by the pressure regulator 60, if provided). At lower flow rates, the fuel control valve 52 may be opened and all or at least some of the fuel discharged from the first pump 14 may be routed through the control valve 52 to the second portion 26 of the reservoir interior 20. If the output of the first pump 14 is constant, then the fuel control valve 52 can be opened and closed based upon the engine fuel demand and the flow rate of fuel needed to support engine operation in combination with the fuel discharged from the second fuel pump 15.

The engine fuel demand can be determined in different ways. For example, the flow rate of fuel discharged from the regulator outlet 72 may be monitored and used to determine the engine fuel demand as a function of the output of the second pump 15 and/or first pump 14. This information may be used to determine the power provided to either or both pumps 14, 15 (e.g. via PWM drive) and/or to control opening and closing of the fuel control valve 52. A flow switch 78 could be used that, when there is fuel flow out of the pressure regulator outlet 72, provides a signal to control the fuel control valve 52 and/or provides a signal that one or the other of the fuel pumps 14, 15 can be shut off until such time as the engine demands a greater fuel flow rate. Alternatively, when there is no fuel flow from the regulator outlet 72, or if the flow out of the regulator outlet 72 is below a threshold, the flow switch 78 may provide a signal to indicate that the fuel flow from one or both fuel pumps 14, 15 should be increased, and/or to close the fuel control valve 52 to increase fuel flow from the first pump 14 that reaches the regulator 60 and main outlet 56 of the fuel pump assembly 10. As an alternative, a valving arrangement such as is shown in U.S. Pat. No. 4,683,864 may be used to mechanically open or close the flow control valve as a function of the flow through the flow control valve.

The fuel control valve 52 may be biased or normally in an open position. In this position, fuel vapors and air in the reservoir interior 20 may be allowed to flow into and through the fuel control valve outlet 64, and such gasses may flow out of the fuel pump 14 through the outlet 48 when the valve 52 is opened, either by fuel flow or by pressure within the pump 14. Further, the first pump outlet 48 could be separately routed from the fuel pump assembly 10, such as through a second outlet of the assembly that is separate from the main outlet 56 already described. That is, the first fuel pump 14 may be communicated with the flow control valve 52 and output from the first fuel pump 14 may flow through the control valve 52 and/or through a second output of the assembly 10 separate from any output from the second pump 15. A second pressure regulator may be used, if desired, in the pump assembly 10 or a pressure regulator may be provided downstream of the assembly 10 with a return line used to return fuel to the reservoir that was discharged from the assembly 10 in excess of engine fuel demand. Thus, the fuel pumps 14, 15 may be arranged in a parallel relationship, and may separately draw fuel into the reservoir interior 20 and separately discharged fuel to the engine 16. The output of the pumps 14, 15 may be combined a in single flow path that exits a single outlet 56 of the assembly 10, or the output of the pumps 14, 15 may be discharged through separate outlets of the assembly.

Figure 2:
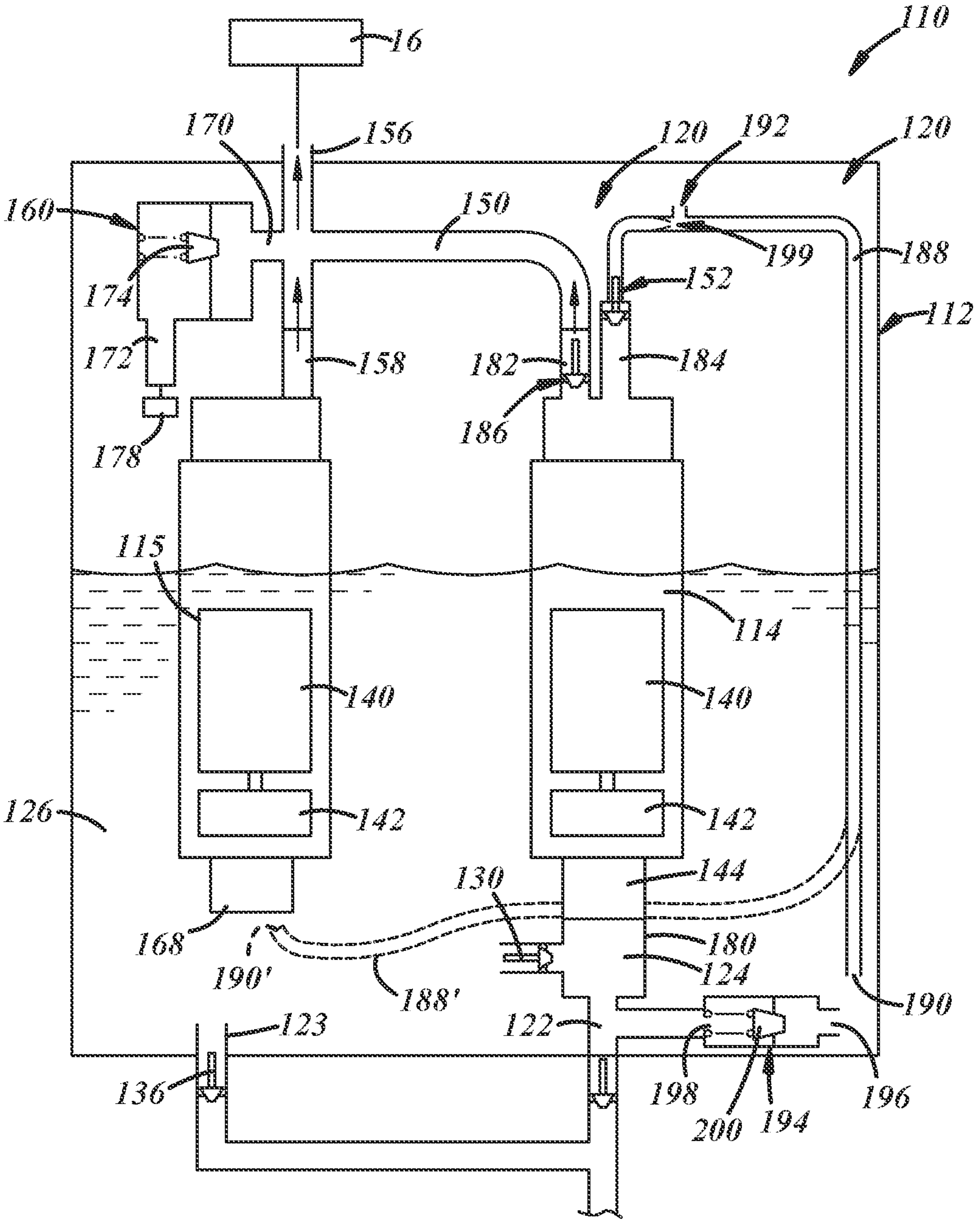
FIG. 2 is a schematic view of another fuel pump assembly.

The fuel pump assembly 110 shown in FIG. 2 has many similar features and components as in the fuel pump assembly 10 shown in FIG. 1. To facilitate the description of the fuel pump assembly 110, components will be given the reference numerals offset by one hundred from the reference numerals given to similar components in the fuel pump assembly 10, and the following description will focus on the differences between the two assemblies 10 and 110.

The fuel pump assembly 110 also includes a first pump 114 and a second pump 115 that are received in an interior 120 of a reservoir 112, to pump fuel into the reservoir 112 and out of the reservoir 112 for delivery to an engine. The second fuel pump 115 has an inlet 168 that draws in fuel and an outlet 158 through which fuel is discharged. The outlet 158 of the second fuel pump 115 may be communicated with a fuel pressure regulator 160 arranged as set forth with regard to the fuel pump assembly 10, and communicated with or routed to the main outlet 156 of the fuel pump assembly 110 for delivery to the engine 16. The second fuel pump 115 may operate as set forth with regard to the second pump 15 in the fuel pump assembly 10, including drawing fuel into the reservoir interior 120 via a second inlet 123 and associated check valve 136, or an optional check valve 130 carried by an inlet body 180 of the first fuel pump 114 to draw fuel in through the first inlet 122, the first portion 124 and the optional check valve 130 (in the latter instance, no second inlet 123 is needed). The inlet body 180 defines the divider in the interior 120, with the first portion 124 of the interior 120 inside the inlet body 180 and the second portion of the interior 120 outside of the inlet body 180.

The first fuel pump 114 has its inlet 144 received in the inlet body 180 and in communication with the first portion 124 defined by the inlet body 180. The first pump 114 draws fuel into the reservoir 112 via the first inlet 122 which leads to the first portion 124, and the first pump 114 then pumps fuel from the first portion 124 and discharges that fuel through one or both of two outlets 182, 184. A first outlet 182 is coupled to or communicated with the outlet 158 of the second pump 115, the fuel pressure regulator 160 and the main outlet 156, as in the fuel pump assembly 10. A check valve 186 prevents fuel flow from the second pump 115, or back flow when the engine 16 is off, from flowing through the first outlet 182 and first pump 114. One difference is that the first outlet 182 is not communicated with the fuel control valve 152, which is instead communicated with a second outlet 184 of the first pump 114.

The second outlet 184 of the first pump 114 directs fuel to the (optional) flow control valve 152, which when open, allows fuel flow through the valve 152 and/or a reduced flow area orifice 199 (sometimes called a jet) and an optional conduit 188 having an outlet 190 within the reservoir interior 120 (e.g. the second portion 126 in communication with the second pump inlet 168). A vent 192 in the conduit 188 prevents a syphoning action from occurring through the conduit 188 when the pumps 114, 115 are off to prevent draining or emptying of fuel from the reservoir 112 if the flow control valve 152 is not utilized. The conduit outlet 190 may be located near the bottom of the reservoir interior 120 so that it is usually submerged in liquid fuel and to direct fuel to the bottom or inlet of the second pump 115. The flow control valve 152 can be opened to direct fuel to the interior 120 of the reservoir 112 and to reduce the flow rate of fuel provided from the first pump 114 to the main outlet 156. The flow control valve 152 can be controlled in the same manner(s) as set forth above with regard to the fuel pump assembly 10.

In a pressurized or enclosed/sealed reservoir, a second fuel pressure regulator 194 may be provided that has an inlet 196 communicating with the second portion 126 of the reservoir interior 120, an outlet 198 communicating with the first portion 124 of the reservoir interior 120, and a valve body 200 between them that is normally closed to prevent fuel flow through the second regulator 194. When the pressure at the inlet 196 of the regulator 194 is equal to or greater than the pressure at which the valve body 200 opens, the valve body 200 will open. This permits fuel flow through the fuel pressure regulator 194 from the second portion 126 and into the first portion 124 of the interior 120 so that fuel from the second portion 126 will be drawn into and pumped by the first pump 114. This diverts fuel from liquid fuel in the second portion 126 of the reservoir interior 120 and thereby controls the pressure therein. Until a certain level of fuel or pressure is present within the second portion 126 of the reservoir interior 120, fuel may be drawn only or primarily from the fuel source (e.g. a fuel tank), and only when the threshold pressure exists at the second regulator inlet 196 does fuel flow from the second portion 126 to the first portion 124 and into the first pump inlet 144. Of course, other arrangements are possible and will be understood to persons skilled in this art in view of this disclosure.

The second outlet 184 of the first pump 114 and conduit 188 may divert output fuel flow from the first pump 114, and may allow the first pump 114 to operate at a pressure that is below system pressure, and may allow air flow through the first pump 114 at a pressure that is below system pressure. The flow control valve 152 may be controlled to increase or decrease the diverted fuel flow. The jet or restrictive orifice 199 may also be used to control the flow rate of fuel from the first pump 114 through the second outlet 184 and conduit 188. The jet may be part of a jet pump that uses the flow of output fuel therethrough to entrain air, vapor and/or liquid fuel into the jet pump. This may be used to evacuate or vent air and vapor from the reservoir interior 120 by moving such fluids to the bottom of the reservoir interior 120 wherein they may be drawn into the second pump 115 (e.g. by the alternate routing of the conduit 188' shown in dashed lines in FIG. 2 with outlet 190').

Like the second pump 115, the first pump 114 may be operated in the same manner(s) as described above with regard to the fuel pump assembly 10. For example, the first pump 114 could be operated at full duty all the time and the flow control valve 152 and fuel pressure regulator 194 may divert some of the first pump output flow back into the reservoir interior 120. As another example, the first pump 114 could be operated at less than full duty including not being powered at all and relying on the operation of the second pump 115 in at least some circumstances, as desired (likewise, the second pump 115 may be shut down and the first pump 114 may provide all fuel flow from the assembly 110, in at least some instances, if desired. This may lower the total system current draw). Alternatively, both pumps could be run at partial duty with the fuel output just matching the engine fuel demand. If so, the pressure from the first pump 114 will provide a boost pressure to the second pump 115, which may enhance performance of the second pump 115.

Further, the assemblies 10, 110 having two or more pumps described herein may meet higher fuel flow rate engine demands with lower current consumption than use of both a single, higher flow rate pump and a lower pressure lift pump that simply moves fuel from a tank to the reservoir 12, 112, or by use of both pumps working in series to provide an increased flow in comparison to either pump's output by itself. The pump assemblies 10, 110 should also prove more efficient and more capable of dry priming the system as both pumps 14, 15 and 114, 115 are able to divert air from the input side to the output side of the fuel pump assembly 10, 110 (as opposed to only one pump being able to pump to the output side/main outlet of the assembly).

Further, even if one pump fails, the other pump can provide at least some fuel to the engine 16 to provide a failsafe mode in which at least some engine fuel demand can be satisfied to support at least some level of engine operation. The still operating pump can also more easily draw fuel into the reservoir interior 20, 120 due to the parallel arrangement of the fuel pumps. In prior arrangements, the fuel pumps were arranged in series with only the lift pump drawing fuel into the reservoir and only the high pressure pump delivering fuel to the engine. If the high pressure pump failed, there was little or no fuel flow to the engine. If the lower pressure lift pump failed, the high pressure pump would have to draw fuel through the lift pump to get fuel into the reservoir which either resulted in no flow into the reservoir or a low flow rate which then negatively impacted the output flow rate of the high pressure pump.

Figure 3:
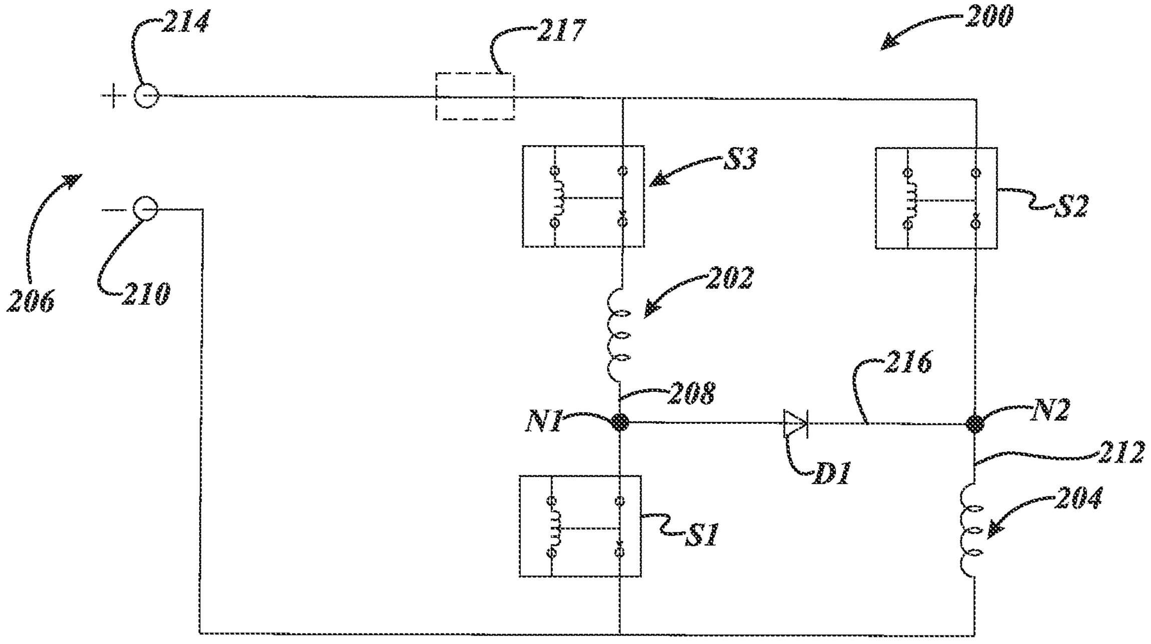
FIG. 3 is a schematic of a circuit through which power is supplied to fuel pumps, showing power supplied to the fuel pumps in parallel.
Figure 4:
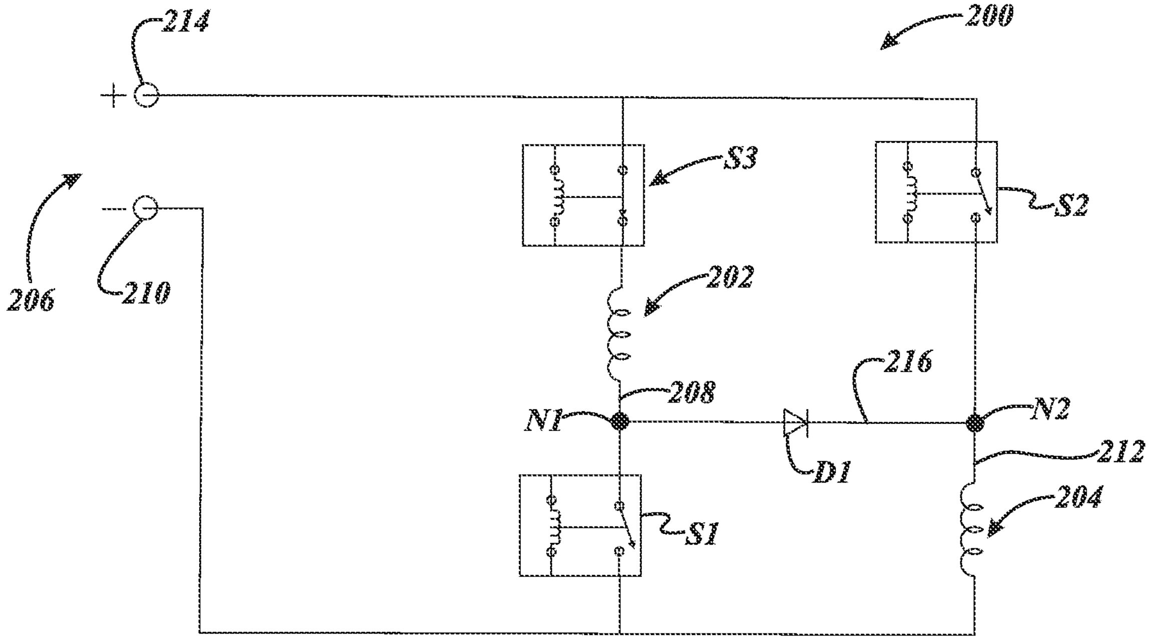
FIG. 4 is the circuit of FIG. 3 showing power supplied in series to the fuel pumps.

FIGS. 3 and 4 illustrate an electrical schematic diagram of a circuit 200 that may be used to selectively control operation of two or more pumps, with two pumps 202, 204 shown. In this circuit 200, a power supply, such as a battery 206, is coupled to both the first pump 202 and the second pump 204. The first pump 202 may have a higher pressure output fluid flow than the second pump 204, although the pumps could be the same or the second pump may have a higher pressure output fluid flow than the first pump. The pumps 202, 204 may be arranged as shown in and described with reference to FIGS. 1 and 2, with regard to fluid flow paths, valves and the like.

As shown in FIG. 3, the power supply 206 is connected to the first pump 202 with a first switch S1 connected between the negative lead 208 of the first pump 202 and the negative power supply terminal or lead 210. The power supply 206 is also connected to the second pump 204 with a second switch S2 between the positive lead 212 of the second pump 204 and the positive terminal 214 of the power supply 206. A conductor 216 may extend between a node N1 provided between the first pump 202 and first switch S1 and a node N2 provided between the second pump 204 and second switch S2. A diode D1 controls the direction of current flow through the conductor 216.

In the example shown, a control switch or relay (not shown) may be provided by a system to which the pumps 202, 204 and circuit 200 are connected, for example, a vehicle control system which may include a relay or other switch that enables power supply to the pumps 202, 204 only when, for example, a vehicle ignition is activated or other action is taken to start an engine to which the pumps supply fuel. By way of example, some vehicles enable use of the power supply 206 even without the engine running, such as to enable use of a radio or other devices or accessories. So that fuel is provided only when the engine needs fuel, the control switch may be open until an activation step is detected. With the control switch open, no power is provided from the power supply 206 to either the first pump 202 or second pump 204. When the control switch is closed, power is provided to both the first and second pumps 202, 204.

The first switch S1 and second switch S2 are shown as single pole relays, but could be any desired type of switch or relay including, but not limited to, semiconductor switches like a SCR, MOSFET, BJT, MCT, IGCT or IGBT. Changing the state of the switches S1, S2 changes the current flow within the circuit 200. In the example shown in FIG. 3, the first switch S1 and second switch S2 are both closed (e.g. conductive) and current flows in parallel to the first pump 202 and the second pump 204. As shown in FIG. 4, when the first switch S1 and second switch S2 are both open (e.g. not conductive), current flows in series to the first pump 202 and to the second pump 204, through the conductor 216 and its diode D1.

A third switch S3 may also be provided, and when open, may prevent power from being supplied to one or both pumps. In the example shown, when the third switch S3 is open, power can be provided to the second pump 204 only when the second switch S2 is closed. The third switch S3 could be located elsewhere, for example in the location shown by the dashed line box 217 in FIG. 3, and when open, could prevent power from being supplied to either pump 202, 204. Other options for controlling the power supply to the pumps may be used, as desired. For example, the diode D1 could be replaced with a single pole relay or a switch, and the third switch S3 could be eliminated. As another example, the first switch S1 and the diode D11 could be replaced with a single throw double pole relay. Further, the pumps could be powered individually as needed, and different switch/relay arrangements may be used to accomplish the desired pump operation.

Figure 5:
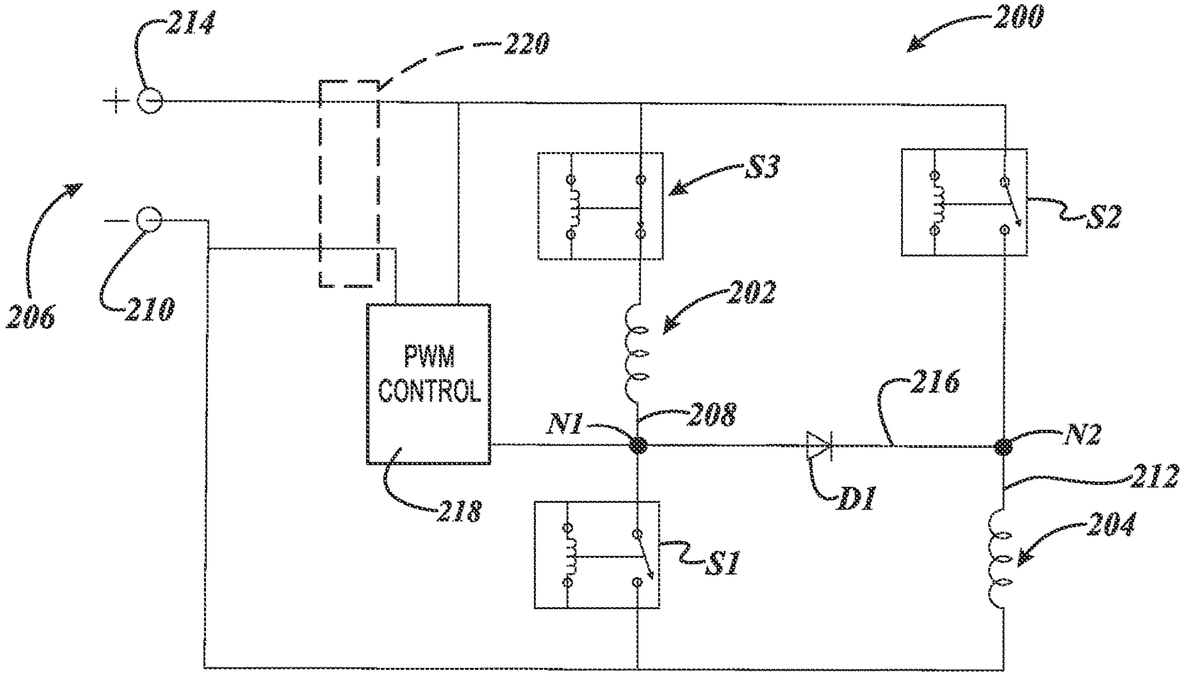
FIG. 5 is a schematic of a circuit like that shown in FIG. 4, and including a pulse width modulated controller.

Further, as shown in FIG. 5, a controller 218 may be provided to increase or decrease the voltage at, for example, node N1. This configuration of the circuit can be used to adjust the electrical match point of the fuel pumps 202, 204 so that the operating points of the individual pumps can be matched or optimized to meet system requirements under idle or partial load conditions. As the diode would be forward biased it would conduct electricity from the negative terminal of the first pump 202 to the positive terminal of the second pump 204. If another switching device were to be used in place of the diode the intent would be that it is on or set to a closed circuit status. In the example shown, the controller 218 is a pulse width modulated (PWM) control which may enable more precise control of the voltage. A benefit associated with adding PWM control to the node N1 is that the amount of current that the controller 218 has to provide or consume will only be the amount required to shift the voltage of one pump up or down, and the remaining current is consumed by or provided to the second pump. As an option, a circuit, device or controller 220 (FIG. 5) may also provide reverse battery protection between the power supply 206 and the pumps 202, 204 or such protection, if desired, can be provided on the vehicle side of the system.

One exemplary implementation of the circuit 200 was tested with two fuel pumps. The two pumps, when operated at 13 volts and coupled in a standard parallel only power supply circuit, produced a total fuel flow of about 340 liters per hour at a system pressure of 500 kPa, and consumed 22.9 amps and 298 watts. Thus, the power consumption was high and the output flow rate was high. The output flow rate in such a system is set to satisfy the maximum engine fuel demand and so, when the engine has a lesser fuel demand, the pumped fuel is recirculated within the reservoir. Only a small percent of that fuel flow may be needed at low engine speed and low load operation, such as at idle and near idle speed operation. Thus, the power consumed, heat generated and fuel flow rate in the system are considerably more than is needed to support engine operation. Next, the pumps were connected in series instead of in parallel, and the first pump (e.g. the higher pressure pump) was operated with a PWM at 10% to 30% duty cycle. When powered by a 13-volt power source, the pumps produced a flow rate of 117 liters/hour at 500 kPa, and consumed 8.29 amps and 108 watts. Next, the two pumps were operated with the circuit 200 of FIG. 3 including the first switch S1 in its closed state and the second switch S2 open such that the pumps were provided power in series. When powered by a 13-volt power source, the pumps produced a flow rate of 117 liters/hour at 500 kPa, and consumed 8.12 amps and 106 watts.

Thus, when the engine has a fuel demand equal to or less than 117 liters/hour, the pumps can be operated in this fashion which greatly reduces the electrical demand from the system and conserves power. Further, less fuel is pumped which means a greater percentage of the pumped fuel is delivered to the engine and less fuel is heated and recirculated within the reservoir. In other words, less energy is wasted and less heat is generated in the fuel and in the fuel system generally. In many engine applications, the lower fuel flow rate is sufficient to support engine operation from idle up to about 50% of maximum engine fuel demand. Of course, some higher performance engines require a higher flow rate and this lower fuel flow rate would be sufficient for less of a range of engine speeds, perhaps only up to about 30% of maximum engine fuel demand. When a higher fuel flow rate is required, the first switch S1 and second switch S2 can be closed to provide power to both pumps in parallel and provide a higher fuel flow rate with greater energy consumption.

Further, by controlling the state of the first switch S1, the system can be used to achieve intermediate fuel flows between the high fuel flow and high electrical energy consumption of the parallel power supply scenario and the lower fuel flow and low electrical energy consumption of the series power supply. That is, the system can be operated with the first switch S1 opened for part of the time and closed for part of the time to control the system fuel flow rate and also tailor the energy consumption more closely to the engine fuel demand. This can more closely match the system's ability to provide electrical power. For example, in systems with an alternator, the alternator might struggle to supply power sufficient to operate both pumps when the engine speed is low and hence, the alternator is driven at a lower speed. However, at higher engine speeds, the alternator is driven at a higher speed and can more readily supply power to both pumps.

Also, in some systems or in some situations, only a lesser voltage is provided from the power supply 206. This may occur, for example, during a cold start and initial cold operation of an engine. Accordingly, the system can be operated to ensure a sufficient fuel supply even when only a limited electrical energy supply is available. In one test, the system achieved up to 275 liters/hour flow rate at over 330 kPa, when operated at 11 volts and took 9 amps to operate with the pumps powered in parallel.

Figure 6:
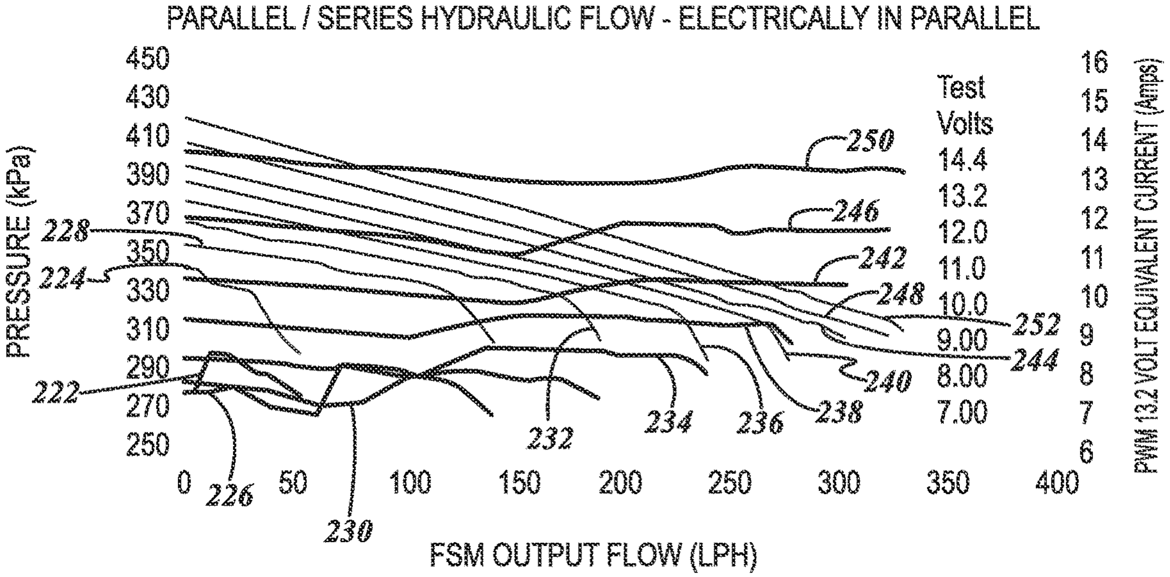
FIG. 6 is graph of output flow, pressure and current for different test of fuel pumps operated electrically in parallel.

A representative graph of pump performance with the pump operated electrically in parallel is shown in FIG. 6. In this graph, pump performance at 7 volts is indicated by line 222 which shows output pressure and fuel flow rate and line 224 which shows the current draw in amps, pump performance at 8 volts is indicated by line 226 which shows output pressure and fuel flow rate and line 228 which shows the current draw, pump performance at 9 volts is indicated by line 230 which shows output pressure and fuel flow rate and line 232 which shows the current draw, pump performance at 10 volts is indicated by line 234 which shows output pressure and fuel flow rate and line 236 which shows the current draw, pump performance at 11 volts is indicated by line 238 which shows output pressure and fuel flow rate and line 240 which shows the current draw, pump performance at 12 volts is indicated by line 242 which shows output pressure and fuel flow rate and line 244 which shows the current draw, pump performance at 13.2 volts is indicated by line 246 which shows output pressure and fuel flow rate and line 248 which shows the current draw, and pump performance at 14 volts is indicated by line 250 which shows output pressure and fuel flow rate and line 252 which shows the current draw. Thus, lines 238 and 240 illustrate the pump performance at 11 volts described in the preceding paragraph.

Figure 7:
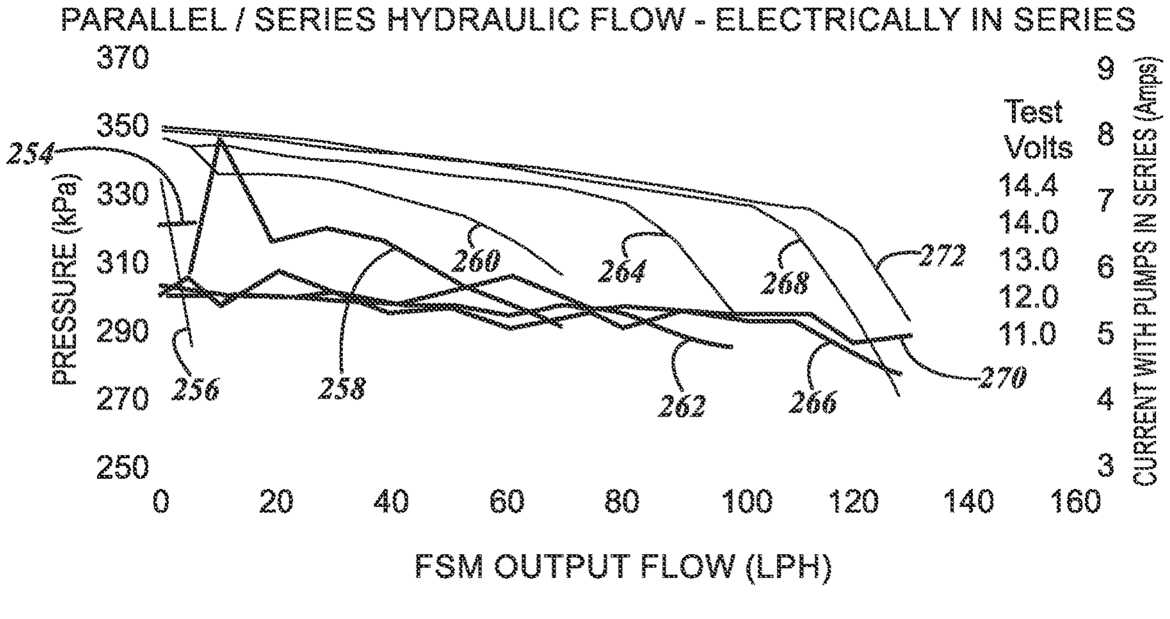
FIG. 7 is graph of output flow, pressure and current for different test of fuel pumps operated electrically in series.

A representative graph of pump performance with the pump operated electrically in series is shown in FIG. 7. In this graph, pump performance at 11 volts is indicated by line 254 which shows output pressure and fuel flow rate and line 256 which shows the current draw, pump performance at 12 volts is indicated by line 258 which shows output pressure and fuel flow rate and line 260 which shows the current draw, pump performance at 13 volts is indicated by line 262 which shows output pressure and fuel flow rate and line 264 which shows the current draw, pump performance at 14 volts is indicated by line 266 which shows output pressure and fuel flow rate and line 268 which shows the current draw, and pump performance at 14.4 volts is indicated by line 270 which shows output pressure and fuel flow rate and line 272 which shows the current draw.

Thus, the fluid flow output of a multiple pump system can be controlled, for example, as shown in FIGS. 1 and 2 and described above. In addition or instead, the pumps may be electrically powered in series or parallel, and this may be done in combination with a PWM control, if desired, as shown in FIG. 3 and described above. In this way, the fluid flow characteristics can be controlled in accordance with engine fuel demand, and the electrical energy required can be reduced in many engine operating conditions to provide a more efficient system. Further, with the improved control of the fuel pumps, pumps having lower maximum output ratings may be used and these pumps are often much less expensive than higher performance pumps.

For example, a conventional high output fuel system uses a fill pump to move fuel into a reservoir and a high pressure pump takes in this fuel from the reservoir, increases the pressure of the fuel and sends the higher pressure fuel to the engine. In this system, full electrical power or voltage is provided to both the lift pump and high pressure fuel pump all the time. Further, the system does not have a valve mechanism to allow the fuel pump outputs to combine in series. In the system disclosed herein, relays are used to operate the pumps in series at engine idle so that full electrical power is not always provided to the fuel pumps. Further, the system disclosed herein allows the fuel flows from two fuel pumps to combine via automatic switching of valves to produce a higher output fuel flow rate. In this system, the fuel pump outputs can be combined to allow higher output in higher engine fuel demand situations. In lower engine fuel demand situations, the controller can reduce the voltage to the fuel pumps supporting reductions in the flow rate and or pressure to further support hydraulic actuation of a valve or valves that automatically change the flow circuit from combining in parallel to operating in series.

It is to be understood that the foregoing description is not a definition of the invention, but is a description of one or more preferred embodiments of the invention. The invention is not limited to the particular embodiment(s) disclosed herein, but rather is defined by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, a method having greater, fewer, or different steps than those shown could be used instead. All such embodiments, changes, and modifications are intended to come within the scope of the appended claims.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A fuel system, comprising:

a first fuel pump and a first switch adapted to be coupled to a power supply;

a second fuel pump adapted to be coupled to the power supply; and a conductor between a first node between the first fuel pump and the first switch and a second node to which the second fuel pump is electrically coupled or electrically communicated so that depending upon the state of the first switch power may be supplied to the first fuel pump and second fuel pump in series or in parallel.

2. The system of claim 1, wherein when the first switch is open the first fuel pump and second fuel pump are electrically in series.

3. The system of claim 1, wherein when the first switch is closed the first fuel pump and second fuel pump are electrically in parallel.

4. The system of claim 1, further comprising a second switch arranged so that when the second switch is open current does not flow to either the first fuel pump or second fuel pump, and when the second switch is closed, current may flow to the first fuel pump and second fuel pump.

5. The system of claim 1, wherein the first switch is connected between a negative lead of the first pump and a negative terminal adapted to be coupled to a power supply.

6. The system of claim 4, wherein the second switch is coupled between a positive lead of the second pump and a positive terminal adapted to be coupled to a power supply.

7. The system of claim 1, further comprising a controller coupled to the first switch configured to repeatedly open the first switch for a period of time and subsequently close the first switch for a period of time to control a fluid flow rate of the system to output an intermediate fluid flow rate from the system.

8. The system of claim 7, wherein the controller provides a pulse width modulated signal to the first switch.

9. The system of claim 1, further comprising a second switch arranged so that when the second switch is open and the first switch is open, power is supplied in series to the first fuel pump and to the second fuel pump.

10. The system of claim 1, further comprising a second switch arranged so that when the second switch is closed and the first switch is closed, power is supplied in parallel to the first fuel pump and to the second fuel pump.

11. The system of claim 1, further comprising a pulse width modulated controller coupled to the first node to change the voltage at the first node, and which also includes a diode coupled to the conductor between the first node and the second node, the diode conducting electricity from a negative terminal of the first pump to a positive terminal of the second pump.

12. The system of claim 1, further comprising:

a fuel reservoir defining an interior having a first portion and a second portion;

an interior divider disposed within the fuel reservoir, and sectioning off the second portion from the first portion of the fuel reservoir, the first fuel pump position within the first portion and the second fuel pump positioned within the second portion;

two oppositely acting check valves coupled to the divider for controlling fuel flow between the first portion and the second portion of the interior;

a conduit communicating an output of the second fuel pump to an engine;

a passage communicating an output of the first fuel pump to the conduit, the passage having a check valve configured to permit fluid flow from the first fuel pump to the engine and to prevent reverse flow through the passage, the passage also having a relief valve configured to discharge fuel flow from the passage into the fuel reservoir; and a pressure regulator connected to the conduit to regulate a pressure of fuel delivered to the engine.

13. A fuel system, comprising:

a first fuel pump and a first switch adapted to be coupled to a power supply;

a second fuel pump and a second switch adapted to be coupled to the power supply; and a conductor between a first node between the first fuel pump and the first switch and a second node between the second switch and the second fuel pump, wherein when the second switch is open and the first switch is open, power is supplied in series to the first fuel pump and to the second fuel pump to output a low level fluid flow rate, and when the second switch is closed and the first switch is closed, power is supplied in parallel to the first fuel pump and to the second fuel pump to output a high level fluid flow rate.

14. The system of claim 13, further comprising a controller coupled to the first switch and configured to repeatedly open the first switch for a period of time and subsequently close the first switch for a period of time to output an intermediate fluid flow rate of the system.

15. The system of claim 14, wherein the controller provides a pulse width modulated signal to the first switch.

16. The system of claim 13, further comprising a pulse width modulated controller coupled to the first node to change the voltage at the first node, and which also includes a diode coupled to the conductor between the first node and the second node, the diode conducting electricity from a negative terminal of the first pump to a positive terminal of the second pump.

17. The system of claim 13, wherein the first switch is coupled between the negative lead of the first fuel pump and a negative power supply terminal, and the second switch is coupled between the positive lead of the second fuel pump and a positive power supply terminal.

18. The system of claim 13, further comprising:

a fuel reservoir defining an interior having a first portion and a second portion;

an interior divider disposed within the fuel reservoir, and sectioning off the second portion from the first portion of the fuel reservoir, the first fuel pump position within the first portion and the second fuel pump positioned within the second portion;

two oppositely acting check valves coupled to the divider for controlling fuel flow between the first portion and the second portion of the interior;

a conduit communicating an output of the second fuel pump to an engine;

a passage communicating an output of the first fuel pump to the conduit, the passage having a check valve configured to permit fluid flow from the first fuel pump to the engine and to prevent reverse flow through the passage, the passage also having a relief valve configured to discharge fuel flow from the passage into the fuel reservoir; and a pressure regulator connected to the conduit to regulate a pressure of fuel delivered to the engine.

19. A fuel system, comprising:

a fuel reservoir defining an interior having a first portion and a second portion;

an interior divider disposed within the fuel reservoir, and sectioning off the second portion from the first portion of the fuel reservoir;

two oppositely acting check valves coupled to the divider for controlling fuel flow between the first portion and the second portion of the interior;

a first fuel pump positioned within the first portion of the interior;

a second fuel pump positioned within the second portion of the interior;

a conduit communicating an output of the second fuel pump to an engine;

a passage communicating an output of the first fuel pump to the conduit, the passage having a check valve configured to permit fluid flow from the first fuel pump to the engine and to prevent reverse flow through the passage, the passage also having a relief valve configured to discharge fuel flow from the passage into the fuel reservoir;

a pressure regulator connected to the conduit to regulate a pressure of fuel delivered to the engine;

a power supply connected to the first and second pump;

a first switch connected between a negative lead of the first pump and a negative power supply terminal of the power supply;

a second switch connected between a positive lead of the second pump and a positive power supply terminal of the power supply;

a first node disposed between the first fuel pump and the first switch;

a second node disposed between the second switch and the second fuel pump;

a conductor configured to flow current:

in series to the first and second fuel pump when the first and second switches are open for a low output to the engine, and in parallel to the first and second fuel pump fuel pump when the first and second switches are closed for a high output to the engine; and a controller configured to increase or decrease the voltage at the first node, thus adjusting an electrical match point of the first and second fuel pumps so that the operating points of the individual pumps can be optimized to meet engine requirements under idle or partial load conditions.

* * * * *